(12) United States Patent
Gesell et al.

(10) Patent No.: US 6,805,520 B2
(45) Date of Patent: Oct. 19, 2004

(54) SIDE-MILLING CUTTER

(75) Inventors: Reinold Gesell, Weihenzell (DE); Jürgen Bär, Fürth (DE)

(73) Assignee: Widia GmbH, Essen (DE)

( * ) Notice: Subject to any disclaimer, the term of this patent is extended or adjusted under 35 U.S.C. 154(b) by 0 days.

(21) Appl. No.: 10/258,184

(22) PCT Filed: Jun. 6, 2001

(86) PCT No.: PCT/DE01/02121

§ 371 (c)(1),
(2), (4) Date: Oct. 18, 2002

(87) PCT Pub. No.: WO01/94065

PCT Pub. Date: Dec. 13, 2001

(65) Prior Publication Data

US 2003/0143045 A1  Jul. 31, 2003

(30) Foreign Application Priority Data

Jun. 8, 2000 (DE) .......................................... 100 27 945

(51) Int. Cl.[7] .............................................. B23B 15/28
(52) U.S. Cl. .......................... 407/113; 407/114; 407/35
(58) Field of Search ................................ 407/113, 114, 407/115, 35, 56, 48, 51, 53; 82/106, 107

(56) References Cited

U.S. PATENT DOCUMENTS

| 4,861,204 | A | * | 8/1989 | Berstein et al. | 407/12 |
|---|---|---|---|---|---|
| 5,090,845 | A | * | 2/1992 | Bentjens | 407/52 |
| 5,373,631 | A | * | 12/1994 | Schmid | 82/106 |
| 5,919,008 | A | * | 7/1999 | Shimomura | 82/106 |
| 6,227,772 | B1 | * | 5/2001 | Heinloth et al. | 407/113 |

FOREIGN PATENT DOCUMENTS

| DE | 35 25 514 | 1/1987 |
|---|---|---|
| DE | 38 24 348 | 1/1989 |
| DE | 197 43 971 | 4/1999 |

* cited by examiner

Primary Examiner—Willmon Fridie, Jr.
(74) Attorney, Agent, or Firm—Herbert Dubno

(57) ABSTRACT

A milling cutting has a rotatable cylindrical tool carrier and is provided with polygonal cutting inserts including radial cutting inserts on the sides of the carrier and longitudinal cutting inserts on the cylindrical periphery which alternate with the radial inserts. The tangential cutting inserts have their cutting edges inclined to the axis or rotation at about 25° and have their rear most parts at a spacing from the cutting edge of the next following radial insert of less than 5 mm. The tool is especially useful for machining the cheeks and pins of a crank shaft.

6 Claims, 5 Drawing Sheets

SIDE-MILLING CUTTER

CROSS REFERENCE TO RELATED APPLICATIONS

This application is a national stage of PCT PCT/DE01/02121 filed 6 Jun. 2001 and is based upon German national application 10027945.7 of 8 Jun. 2000 under the International Convention.

The invention relates to a side-milling cutter for the chip-removal machining of cylindrical contours on a workpiece, especially eccentrically disposed cylindrical contours on a workpiece rotatable about a longitudinal axis like a crankshaft. More particularly the invention relates to a milling tool, having a multiplicity of peripherally arranged cutting inserts on a disk-shaped tool carrier and inclined at an axial inclination angle, of which a part of the inserts are used for cheek and undercut machining and are radially clamped and another part of the inserts are used for pin outer diameter machining and are tangentially clamped on the tool carrier.

BACKGROUND OF THE INVENTION

In WO 96/39269, a method for the chip-removal machining of cylindrical correctors and a device for carrying out this method are described. The cited method uses a so-called cut division in which, in the production of the final contour which can be to the final dimensions or can still have a certain amount to be removed and which can be taken off by grinding or polishing, tools are used which are fitted with cutting inserts disposed one after another or which can simultaneously engage with the workpiece. In the case of a crankshaft, the cheeks are machined and undercuts are formed and the pins of the crankshaft or the formation of a half crankshaft cheek with an undercut or a diameter portion can be formed with a first tool and a second undercut and the remaining portion of the diameter with a second tool. The subdivision enables a variation of the bearing width within certain limits. Preferably the machining is carried out by so-called high-speed milling in which the tool is driven with a constant high speed or with a variable speed. In high-speed milling, a cutting speed of more than 160 m/min is used. The chip thickness is in the range of 0.05 to 0.1 mm. The length of the tool carrier over which the corresponding cutting insert is engaged relative to its total length is selected to be as small as possible. With this feature, surface quality can be achieved that is so high that the preliminary grinding or additional pretreatment required prior to the heat treatment as additional process steps can be completely eliminated. With the method described in WO 96/39269 it has been proposed to provide different tools with turning cutting plates for cheek machining on the one hand or for pin machining and for undercutting on the other. All of the cutting inserts used had positive rake angles whereby the cutting insert settings with respect to the workpiece were such that the effective rake angle varied between $-5°$ and $+15°$, preferably $-5°$ to $+5°$ and/or had a positive axial rake angle (back rake angle) up to $10°$.

In a there-described special embodiment, a side-milling cutter had two types of cutting plates of which one type were radially clamped to the tool carrier and the second type were tangentially clamped to the tool carrier or tool receiver.

If the side-milling cutter has on its cylindrical peripheral surface two rows of tangentially clamped cutting plates disposed next to one another in the case of finishing inaccuracy or with a divided tool, a step can develop with position inaccuracies of the machine tool by means of which, in the overlap region of the machined workpiece an undesirable sharp-edged setback can arise. To prevent this over-cut, WO 96/39269 has proposed a cutting insert whose rake surfaces in the region of a cutting corner and the main cutting edge are beveled or set in a region extending over both neighboring main cutting edges. Such cutting inserts enable the formation of clean transitions in the overlap region, for example in the production of the pin surfaces of a crankshaft lifter pin.

In WO 96/39260, radially clamped cutting inserts have been illustrated for forming an undercut in a crankshaft.

In DE 197 39 300 A1, a cutting insert has been described for the cutting of structural shapes, especially for milling of profiled cuts in rotating workpieces like crankshafts. These cutting inserts have a substantially cubical base body with at least two useful cutting edges, two mutually parallel, planar side faces traversed by a fastening bore, two base surfaces which at their opposite ends each form a cutting edge which has an arc shape corresponding to the profile to be cut and is bounded by a rake surface. The free surface between two opposite cutting edges should be at least partly circularly concave. Because of the concave-free area configuration, there is a clearance angle enlargement and a greater clearance space open toward the middle of the clearance surface whereby a desired tilt of this cutting insert relative to the workpiece is enabled.

OBJECT OF THE INVENTION

It is an object of the present invention to further develop a side-milling cutter of the type described at the outset so that softer cutting during machining is ensured.

SUMMARY OF THE INVENTION

With the side-milling cutter according to the invention the object of enabling the greatest possible number of cutting tools to be mounted on the provided cylindrical periphery of the side-milling cutter is attained in that the tangentially clamped cutting inserts are at an axial inclination angle of $25°\pm10°$, preferably at an inclination angle of $20°$ to $30°$. Seen opposite the mill rotation direction, the rearmost cutting corner of such a cutting insert lies at a straight line perpendicular to the direction of rotation of the side mill cutter which is spaced from the leading cutting edge of the subsequent radially clamped cutting insert by a distance of $\leq 5$ mm, preferably $\leq 2$ mm and extending into negative values.

With side-milling cutters known from the art, the setting of the axial angle is limited to small values in order to keep the spatial requirements of the tangentially clamped and preferably square rake surfaces on the cutting inserts on the periphery as small as possible since a tilting around an axial angle requires a respective spacing from the next following radially clamped cutting insert taking into consideration the enlarged rake chamber formed on the tool carrier. With the selected axial angle inclination for the tangential cutting insert of the invention, is however possible to swing the rearmost cutting corner to the cutting insert inwardly so that its spacing, measured by means of a straight line lying perpendicular to the milling direction, from the cutting edge of the next following radially clamped cutting insert can be reduced preferably from less than 2 mm to even negative values. By negative spacing values an arrangement is understood for the tangentially clamped cutting inserts in which the rearmost cutting edge is spatially located behind the cutting edge of the next following radial cutting insert. With the chosen arrangement it is possible to increase the number of useable cutting inserts on the tool carrier. Preferably the side-milling cutter has, as seen in the direction of cutting, an alternating sequence of tangentially and radially clamped cutting inserts on the cylindrical periphery of the tool carrier or, as stated otherwise, radially clamped cutting inserts along the edges of the side-milling cutter cylinder which respectively (left as well as right) is spatially disposed ahead of a respective tangentially clamped cutting insert. The two rows thus formed of tangentially clamped cutting inserts have cutting inserts which, depending upon the row with which they are associated, have a tilt about an axial angle in the opposite sense from another cutting insert of the other row.

For the machining of cylindrical surfaces without undercuts, a portion of the tangentially clamped cutting inserts can be omitted as will be apparent from the description of FIGS. 4 and 5. In this arrangement there is a spacing of the rearmost cutting corner of such cutting inserts as taken along a straight line which is perpendicular to the cutting direction of the side mill cutter, from the reading cutting edge of the next following radially clamped cutting insert of a distance of $\geqq 10$ mm, preferably $\geqq 5$ mm to negative values.

Preferably the tangentially clamped cutting inserts are so arranged that the shortest distance of the cutting edges which are inactive during machining or their extensions which are turned toward the edges of the side-milling cutter cylinder, to the next following cutting corner of the subsequently arranged radially clamped cutting insert in the cutting direction is selected $\geqq 1$ mm. Through this feature it is ensured that a sufficient place for the requisite rake chamber remains ah ad of the radially clamped cutting insert and chip running off from it does not collide with the inactive cutting edge toward the rake chamber of the tangentially clamped cutting insert or can damage this cutting edge. This is especially of significance for so-called turning cutting plates which respectively have four useable cutting edges. A preferred measure for the axial inclination angle of the tangentially clamped cutting inserts is 25°.

According to a further feature of the invention, the cutting regions of two successive tangentially clamped cutting inserts overlap slightly.

With the side-milling cutter according to the invention, cutting speeds of 160 m/min and greater chip thicknesses of 0.1 mm to 0.25 mm can be removed.

BRIEF DESCRIPTION OF THE DRAWING

An embodiment of the invention is illustrated in the drawing. In the drawing.

SPECIFIC DESCRIPTION

Figure 1:
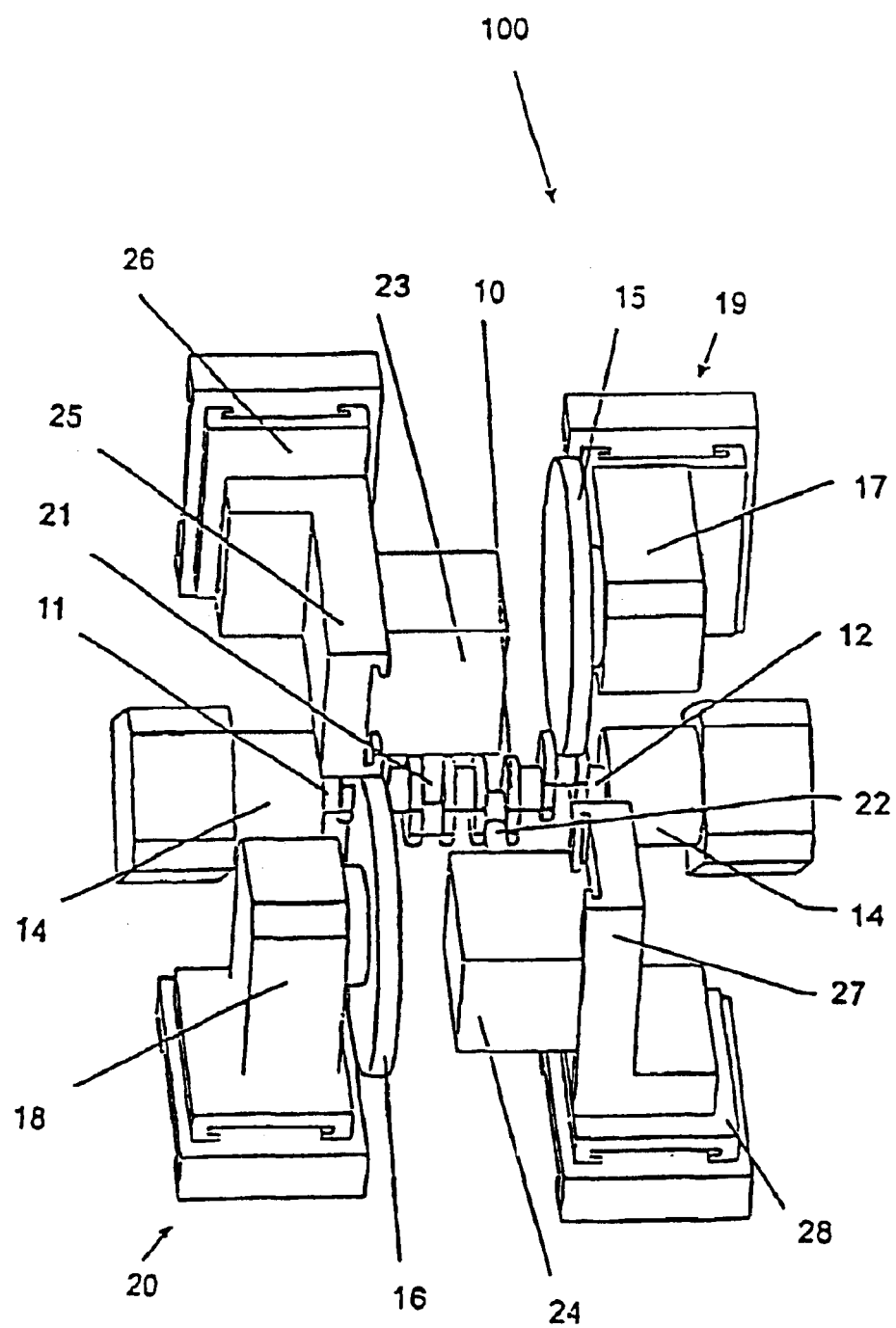
FIG. 1 is a schematic elevation of an apparatus for machining crankshafts.

In FIG. 1 an apparatus 100 for the chip-removing machining of a crankshaft 10 has been shown purely schematically. The crankshaft 10 is so engaged in drivable rotatable clamping chucks 14 with its ends 11 and 12 that it is rotatable about its central axis. For the machining, disk-shaped high-speed cutting tools 15 and 16 are used which can be rotated by corresponding drives 17, 18. Each drive 17, 18 is mounted on a support 19, 20 so that the tool can be adjusted toward an axis of the workpiece. Furthermore, in the illustrated apparatus two orthogonal rotary mills 21, 22 are disposed which are also rotatable by corresponding drives 23, 24. Each orthogonal rotary mill 21, 22 is mounted on a support with a respective pair of slides 25, 26; 27, 28 so that an adjustment of each orthogonal rotary mill 21, 22 relative to the rotating crankshaft is possible. With the illustrated apparatus the simultaneous machining of four lifter bearing locations of the crankshaft is possible.

In order to carry out the chip-removal machining of a crankshaft lifter bearing located outside the eccentrically arranged rotational center of the workpiece 10, the side-milling cutters 15 or 16 must be driven about their central axes with a constant high speed or with a variable higher speed so that cutting inserts arranged on their peripheries are displaced past the machining locations of the workpiece with a corresponding high cutting speed. The machining of crankshafts is described in greater detail in WO 96/39269 to which reference is made.

Each of the side-milling cutters 15, 16 is provided on its cylindrical outer periphery with cutting inserts 29–32 which are there clamped. The cutting inserts 29, 30 are radially clamped and the cutting inserts 31 and 32 are tangentially clamped to the respective disks. By rotation of the side-milling cutters in the direction of the arrows 33 (FIGS. 2 and 4) the selected small cutting arcs are engaged one after the other by the respective active cutting edges of the cutting inserts. Where an axial inclination angle $\alpha=25°$ of the cutting inserts 31 in the clockwise sense is selected, the tangentially clamped cutting inserts 32 are tilted about the inclination axis by $\alpha=25°$ in counterclockwise sense. As a result, the respectively rearmost cutting corners 34 or 35 of the cutting inserts 31 or 32 are tilted inwardly, so that a measure of the spacing a shown in FIG. 2, between the straight line 36 at the cutting corner 34 which is perpendicular to the cutting direction 33 and the cutting edge 37 of the next-following cutting insert 29, can be a $\leqq 5$ mm, preferably a $\leqq 2$ mm.

Optionally, the illustrated rear cutting corners 34 or can also be located "rearwardly" of the cutting edges of the next following radially clamped cutting insert in space. The distance b of the illustrated (inactive) cutting edge 38 to the next lying cutting edge 37 or its end point amounts to at least 0.5 mm.

Figure 2:
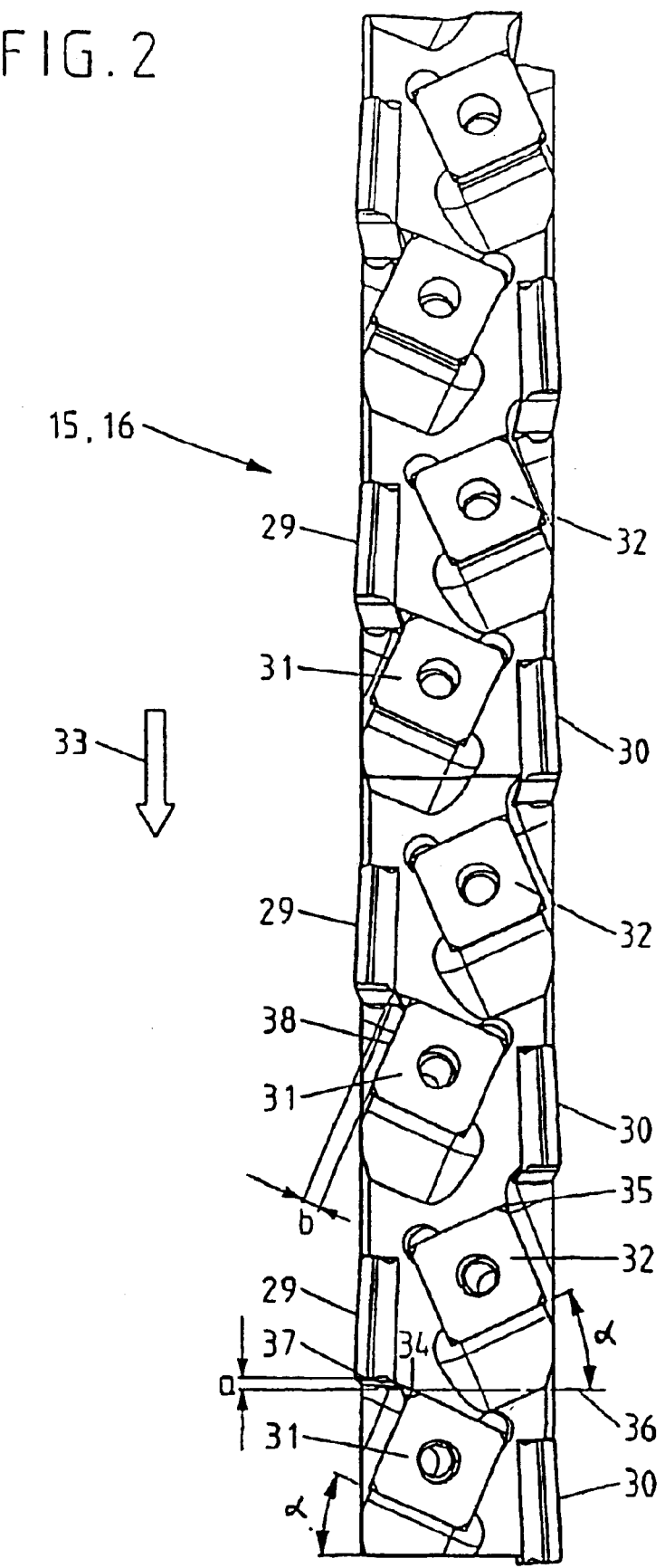
FIG. 2 is a plan view of a part of a side-milling cutter according to the invention with a cylindrical periphery on which cutting inserts are attached.

With the side-milling cutter according to FIG. 2, the simultaneous formation of two undercuts by the cutting inserts 29 and 30 and the machining away of a cylindrical surface by the cutting inserts 31 and 32 is possible. The cutting regions of the two offset rows of tangentially clamped cutting inserts 31 and 32 overlap each other slightly in the axial direction.

Figure 3:
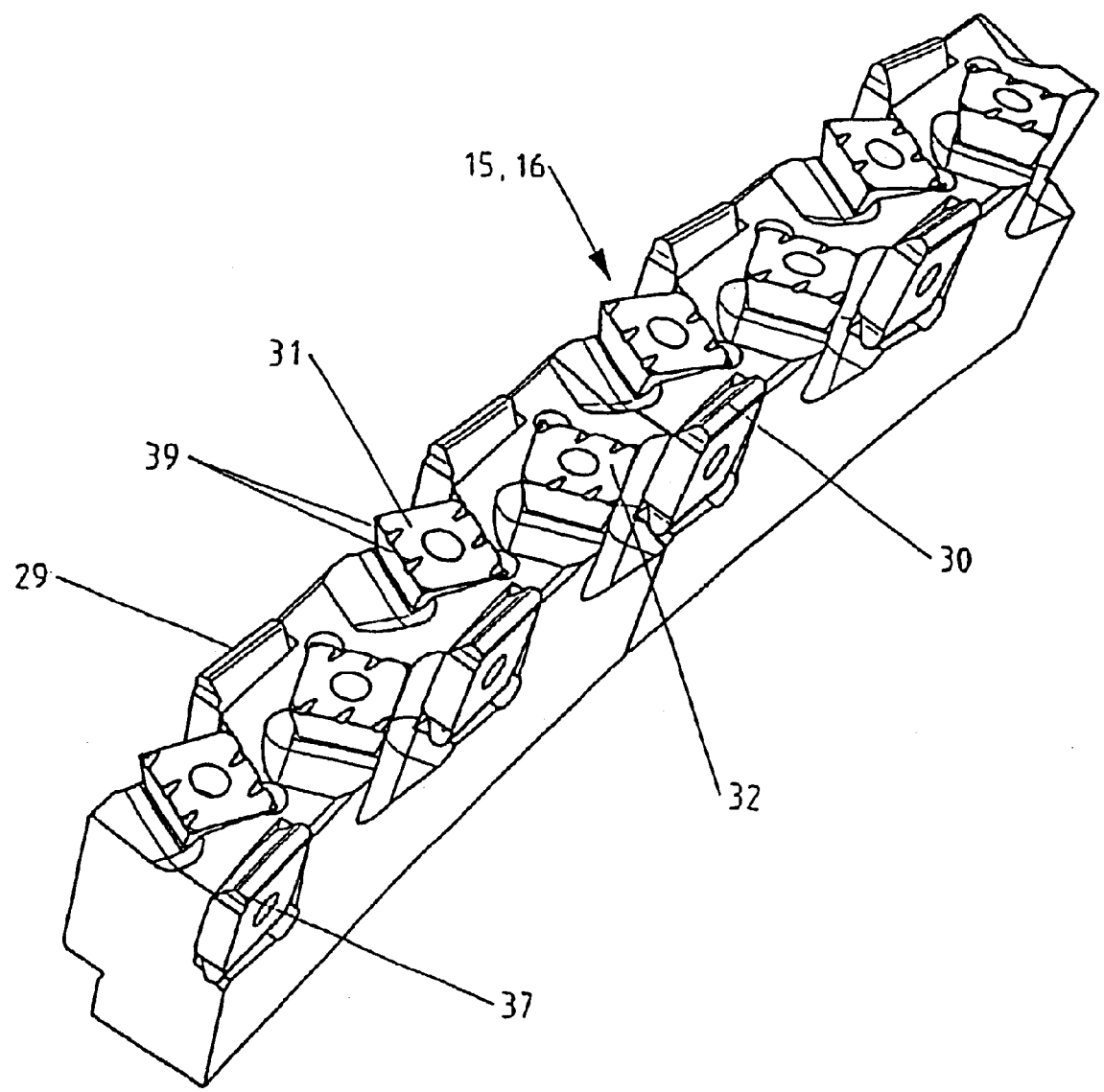
FIG. 3 is a perspective partial elevation of the side-milling cutter of FIG. 2 according to the invention.

The tangentially clamped inserts visible in FIG. 3 have additionally along their respective cutting edges, notches 39 which are basically known from the state of the art. These notches are effective in that during the machining instead of a wide chip, a plurality of smaller chips are produced corresponding to the number of notches. In general the tangentially clamped cutting insert correspond to the tangentially cutting inserts illustrated in WO 96/39269. The radial cutting inserts have a configuration which corresponds to those described in DE 197 39 300 A1.

Figure 4:
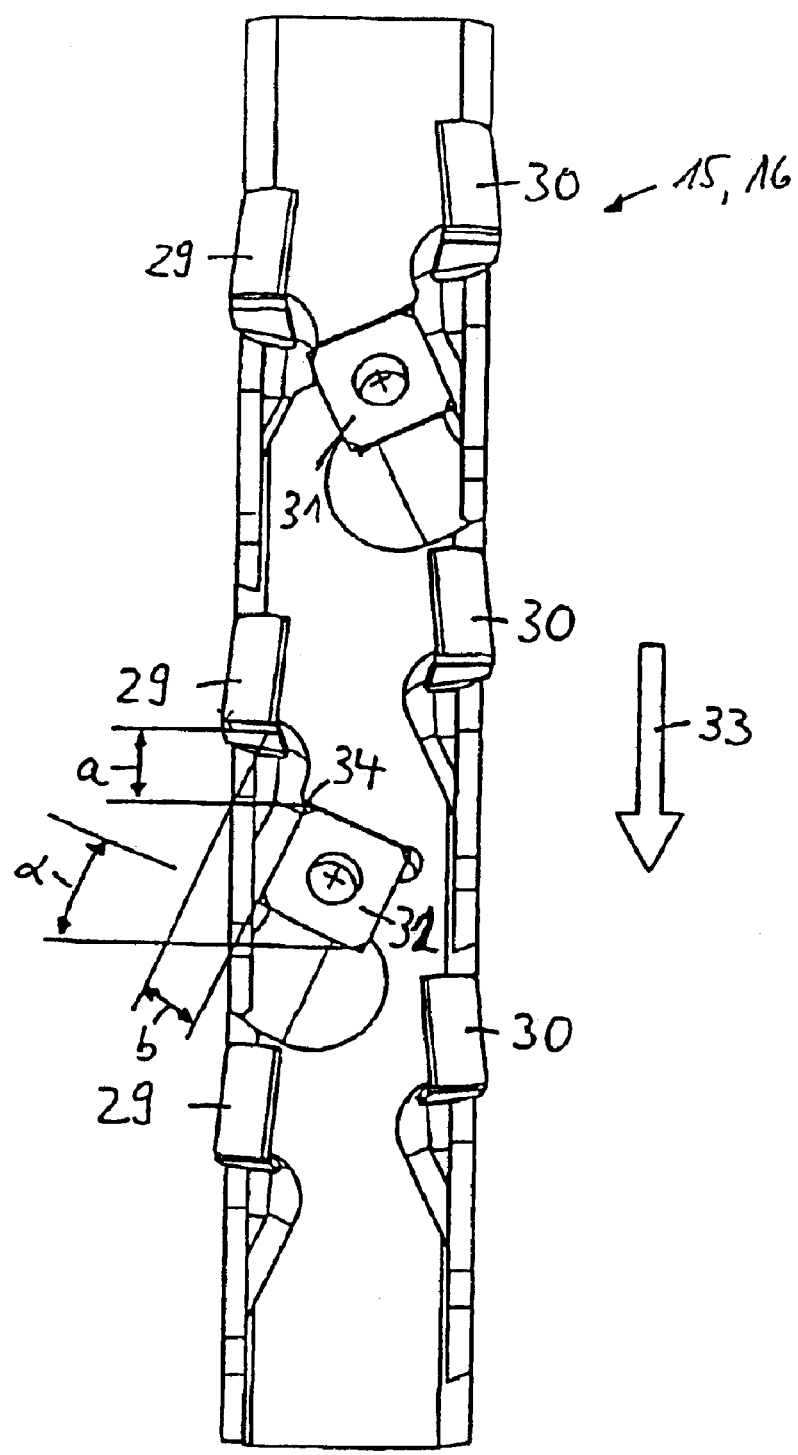
FIG. 4 is a plan view of a part of a further side-milling cutter according to the invention having a cylindrical periphery to which cutting inserts are attached and FIG. 5 is a perspective partial elevation of the side-milling cutter of FIG. 4.
Figure 5:
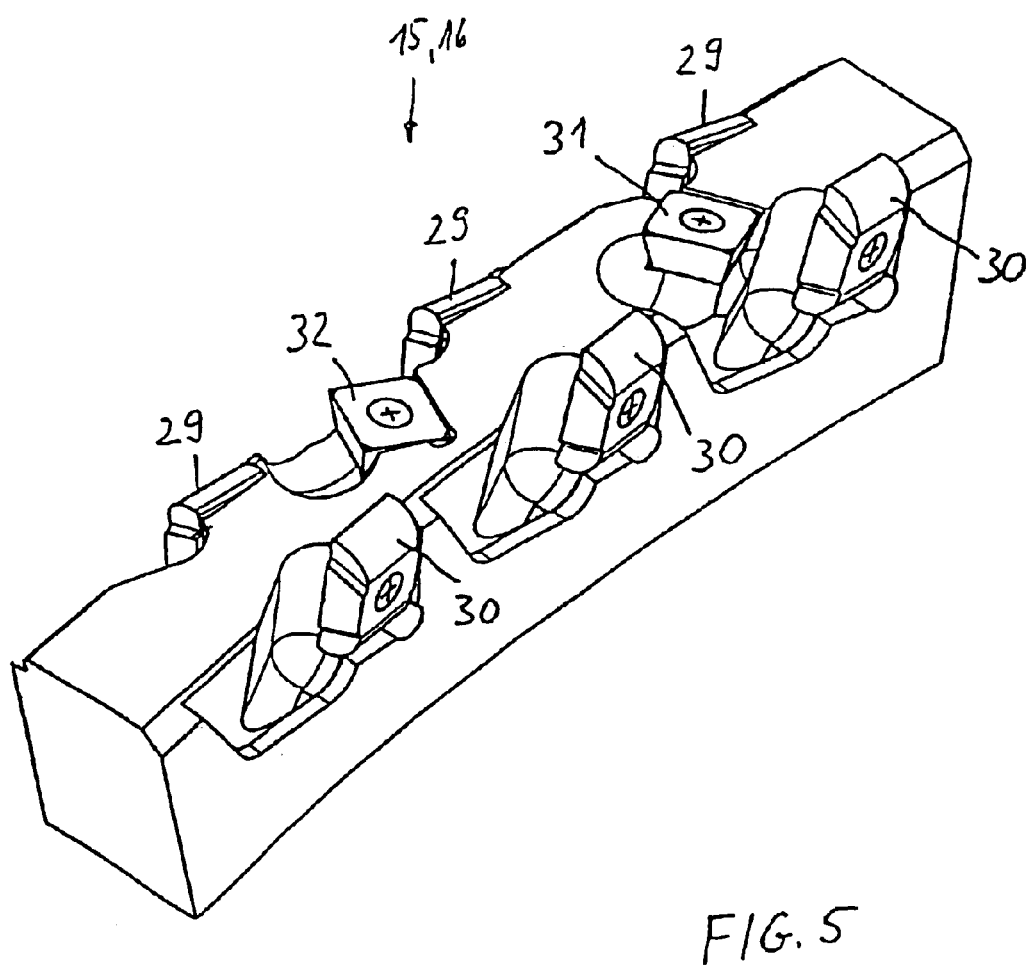

In the embodiment illustrated in FIG. 4, the cutting inserts 29 and 30 are radially clamped. These cutting inserts serve primarily for machining the cheeks, but however do not project radially beyond the tangentially clamped cutting inserts 31 and 32 so that the latter cut in part the pin outer diameter in the edge regions. By contrast to the embodiment illustrated in FIGS. 2 and 3, in the respective alternating sequence there are two left and right radially clamped cutting inserts and only one tangentially clamped cutting insert between the successive radial inserts along the tool, whereby the successive tangentially clamped cutting inserts 31 and 32 are inclined in opposite senses at an axial inclination angle of preferably 25°. The spacing a can here be selected to be somewhat greater and can amount to up to 10 mm. The spacing b can also be selected to be correspondingly greater by comparison to the embodiment illustrated in FIG. 2. Otherwise the same reference characters have been used for identical parts to those of FIG. 2 and reference is made to the description of them.

The tangential cutting inserts 31 and 32 have their configurations as described in WO 96/39269.

We claim:

1. A side-milling cutter for chip removal machining of a cylindrical contour on a workpiece rotatable about a longitudinal axis said side-milling cutter comprising:

disk-shaped tool carrier having a periphery; and a multiplicity of cutting inserts peripherally arranged on said disk-shaped tool carrier and including first polygonal cutting inserts disposed radially and clamped on the tool carrier for cheek machining and undercut machining and polygonal second cutting inserts disposed tangentially and clamped on the tool carrier for outer diameter machining, the tangential second cutting inserts being arranged at axial inclination angles ($\alpha$) of 25°±10°, and having rearmost cutting corners with respect to a cutter rotation direction lying on straight lines (36) perpendicular to the rotation direction and spaced from a leading cutting edge of a following first cutting insert by a distance (a) of $\leq 5$ mm, including negative values.

2. The side-milling cutter according to claim 1 a cutting direction the first cutting inserts and and cutting inserts alternate with one another on the cylindrical periphery of the tool carrier.

3. The side-milling cutter for chip removal machining of a cylindrical contour on a workpiece rotatable about a longitudinal axis said side-milling cutter comprising:

disk-shaped tool carrier having a periphery; and a multiplicity of cutting inserts peripherally arranged on said disk-shaped tool carrier and including first polygonal cutting inserts disposed radially and clamped on the tool carrier for cheek machining and undercut machining and polygonal second cutting inserts disposed tangentially and clamped on the tool carrier for outer diameter machining, the tangential second cutting inserts being arranged at axial inclination angles ($\alpha$) of 25°±10°, have rearmost cutting corners considered in a direction which is opposite a mill rotation direction which is opposite a mill rotation direction using on straight lines perpendicular to the mill rotation direction and have spacings from leading cutting edges of respective following radial first cutting inserts of a distance (a) of $\leq 10$ mm including negative values.

4. The side-mill cutter according to claim 1 wherein a shortest distance (b) between a cutting edge of a tangential second cutting insert which is inactive in machining and which is turned toward an edge of the carrier to a following cutting edge of a first clamped cutting insert in the cutting direction $\geq 0.5$ mm.

5. The side-mill cutter according to claim 1 wherein the axial inclination angle ($\alpha$) of the tangential second cutting inserts (31, 32) amounts to 25°.

6. The side-mill cutter according to claim 1 wherein cutting regions of two tangential second cutting inserts following one another slightly overlap.

* * * * *